No. 737,725. Patented September 1, 1903.

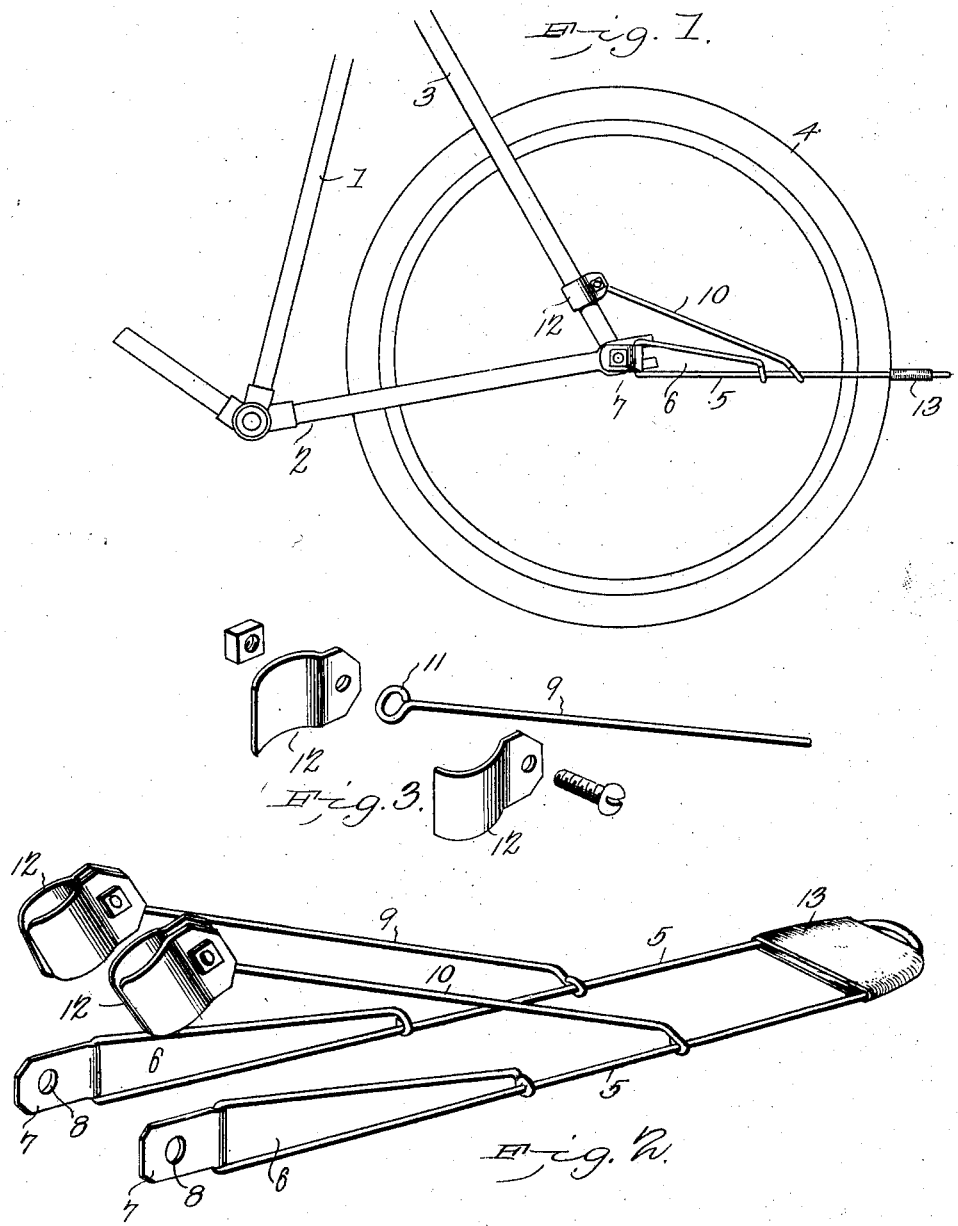

UNITED STATES PATENT OFFICE.

HERMAN FESENFELD, OF HOQUIAM, WASHINGTON.

BICYCLE MUD-GUARD.

SPECIFICATION forming part of Letters Patent No. 737,725, dated September 1, 1903.

Application filed January 2, 1903. Serial No. 137,504. (No model.)

*To all whom it may concern:*

Be it known that I, HERMAN FESENFELD, a citizen of the United States, residing at Hoquiam, in the county of Chehalis and State of Washington, have invented a new and useful Bicycle Mud-Guard, of which the following is a specification.

My invention relates to bicycle mud-guards, and has for its object to produce a device of this character which shall be simple of construction, light and durable, efficient in operation, and may be readily applied to or removed from the bicycle-wheel.

To these ends the invention comprises the details of construction and combination of parts more fully hereinafter described.

In the accompanying drawings, Figure 1 is a side elevation of a portion of a bicycle-frame having my improved device applied thereto. Fig. 2 is a perspective view of the device removed. Fig. 3 is a detail view of the clamp mounted at the end of the brace-rod.

Referring to the drawings, 1 indicates the main vertical post; 2, the horizontal rearwardly-extending brace-bars; 3, the vertical brace-bars of a bicycle-frame, and 4 is the rear wheel mounted in the frame.

All of the above-mentioned parts may be of the ordinary or any desired construction, inasmuch as they are entirely foreign to my invention.

My improved mud-guard comprises, preferably, a single length of wire bent at its center to embrace the periphery of the wheel and form parallel radially-extending arms 5, which when the device is in position on the wheel lie one at either side thereof. Each of these arms has at its inner end a loop 6, formed by bending the free end of the wire angularly and then back upon itself and wrapping its terminal end around the body of the arm.

7 indicates two clips mounted one in each of the loops 6. These clips each preferably comprises a strip of sheet metal folded around the angularly-bent portion of the loop and provided with an aperture 8, adapted to be seated upon the axle-bolt of the wheel and secured thereto by the nut which clamps the bolt in place.

9 and 10 indicate two brace-rods secured one to either of the arms 5. Each brace-rod preferably comprises a single length of wire having its outer end wrapped around the body of the arm and its inner end formed into an eye 11.

12 is a clamp attached to the free end of the brace-rod. This clamp preferably comprises two sheet-metal members formed to conjointly embrace the frame-bar 3. These two members of the clamp are attached to the brace-rod by means of a bolt passed through holes in the members and eye 11 at the end of the rod.

To apply the device to a bicycle, it is simply necessary to seat the apertures in the clips over the ends of the axle-bolt and apply the nuts over the same, then to loosen the nut which secures the clamping members to the brace-rod, apply the clamping members to the respective sides of the brace-bar of the frame, and tighten the nut to clamp the parts securely together.

13 is a guard member of suitable flexible material, preferably in the form of a section of thin rubber tubing, slipped over the outer end of the guard and adapted in operation to bear upon the periphery of the tire and scrape the same.

From the foregoing it will be seen that I produce a device which is at once simple of construction, durable, light, and strong, and may be readily applied to either wheel of the bicycle, the device itself being inexpensive to manufacture. In attaining these ends I do not limit myself to the precise details herein shown and described, as minor changes in the assembling and connecting of the parts may be made without departing from the spirit of my invention.

While I have described the device as being and preferably construct the same of wire, it is to be understood that any other material which in practice is found adapted for the purpose may be employed.

Having thus described the invention, what is claimed is—

1. A bicycle mud-guard comprising a single length of wire bent to embrace the periphery of the wheel and form parallel sustaining-arms, said arms each having a loop formed at its inner end by bending the wire back upon itself and attaching its terminal end to the body of the arm, a clip mounted in said loop and adapted to be seated over and secured to the axle-bolt, braces connected one to each arm and provided at their free ends with clamps adapted to engage the bicycle-frame, and a flexible member carried by the outer end of the guard and adapted to bear upon and scrape the tire.

2. A bicycle mud-guard comprising a single length of metal bent to embrace the periphery of the wheel and form parallel sustaining-arms, means for attaching the arms to the hub of the wheel, a brace carried by each arm and having its end bent around the arm for slidable connection therewith and provided at its free end with an eye, a bolt mounted in the eye, a pair of clamping members mounted on the bolt and operable thereby for clamping or releasing a part of the bicycle-frame, and a flexible member carried by the outer end of the guard and adapted to bear upon and scrape the tire.

In testimony that I claim the foregoing as my own I have hereto affixed my signature in the presence of two witnesses.

HERMAN FESENFELD.

Witnesses:
ERNEST W. RANDALL,
GEORGE FOURNIER.